United States Patent
Nazare et al.

(10) Patent No.: US 12,435,639 B2
(45) Date of Patent: Oct. 7, 2025

(54) ROTATING GROUP FOR TURBOMACHINE HAVING INTEGRATED WHEEL AND LABYRINTH SEAL ARRANGEMENT

(71) Applicant: Garrett Transportation I Inc., Torrance, CA (US)

(72) Inventors: Kiran Somashekar Rao Nazare, Bangalore (IN); Poomkuzhimannil John, Bangalore (IN); Lubos Polak, Velké Meziříčí (CZ); Adam Ingr, Rosice (CZ)

(73) Assignee: GARRETT TRANSPORTATION I INC., Torrance, CA (US)

( * ) Notice: Subject to any disclaimer, the term of this patent is extended or adjusted under 35 U.S.C. 154(b) by 0 days.

(21) Appl. No.: 18/351,593

(22) Filed: Jul. 13, 2023

(65) Prior Publication Data
US 2024/0401493 A1 Dec. 5, 2024

(30) Foreign Application Priority Data
Jun. 1, 2023 (IN) .............................. 202311037868

(51) Int. Cl.
*F01D 11/02* (2006.01)
*F02K 5/00* (2006.01)
(Continued)

(52) U.S. Cl.
CPC .............. *F01D 11/02* (2013.01); *F02K 5/00* (2013.01); *F04D 29/08* (2013.01); *F04D 1/00* (2013.01); *F05D 2240/55* (2013.01)

(58) Field of Classification Search
CPC ........ F01D 11/02; F04D 29/08; F04D 29/083; F04D 29/086; F16J 15/447; F16J 15/4472; F02K 5/00; F05D 2240/55
See application file for complete search history.

(56) References Cited

U.S. PATENT DOCUMENTS

| 4,472,107 A * | 9/1984 | Chang ....................... F01D 3/04 |
| | | 415/170.1 |
| 5,029,876 A * | 7/1991 | Orlando ............... F16J 15/4472 |
| | | 415/174.5 |

(Continued)

FOREIGN PATENT DOCUMENTS

| JP | 5722673 B2 * | 5/2001 | ........... F04D 17/125 |
| JP | 2012251528 A * | 12/2012 | ............. F04D 17/12 |
| WO | 2022073718 A1 | 4/2022 | |

OTHER PUBLICATIONS

JP_5722673_B2_Machine Translation (Sakai, N.) May 27, 2015. [retrieved on Sep. 3, 2024] Retrieved from: Espacenet. (Year: 2015).*

(Continued)

*Primary Examiner* — Elton K Wong
(74) *Attorney, Agent, or Firm* — Ingrassia Fisher & Lorenz | IF&L

(57) ABSTRACT

A turbomachine includes a housing and a rotating group supported for rotation about an axis of rotation within the housing. The rotating group includes a wheel and seal member that is unitary. The wheel and seal member includes a first wheel feature and a second wheel feature that are disposed in a back-to-back arrangement with an outer radial area disposed between the first and second wheel features and facing radially outward from the axis of rotation. The turbomachine also includes a plurality of labyrinthine seal members included on the outer radial area that cooperatively define, with the housing, a labyrinthine seal.

12 Claims, 4 Drawing Sheets

(51) Int. Cl.
*F04D 1/00* (2006.01)
*F04D 29/08* (2006.01)

(56) References Cited

U.S. PATENT DOCUMENTS

| | | | |
|---|---|---|---|
| 5,529,464 A * | 6/1996 | Emerson | F04D 29/047 |
| | | | 415/110 |
| 6,017,184 A | 1/2000 | Aguilar et al. | |
| 9,856,886 B2 | 1/2018 | Kares et al. | |
| 10,218,245 B2 | 2/2019 | Oxman et al. | |
| 2012/0306206 A1 | 12/2012 | Agrawal et al. | |
| 2016/0040545 A1* | 2/2016 | Klusácek | F01D 11/02 |
| | | | 29/889.21 |
| 2017/0321713 A1 | 11/2017 | Clay et al. | |
| 2018/0142694 A1* | 5/2018 | Daussin | F04D 29/051 |
| 2018/0156337 A1* | 6/2018 | Daussin | F16J 15/4472 |
| 2018/0274527 A1 | 9/2018 | Snell | |
| 2019/0178292 A1* | 6/2019 | Iizuka | F02C 6/12 |
| 2021/0355956 A1* | 11/2021 | Donato | F04D 29/266 |

OTHER PUBLICATIONS

JP_2012251528_A_MachineTranslation (Amano, K.) Dec. 20, 2012. [retrieved on Feb. 25, 2025] Retrieved from: Espacenet (Year: 2012).*

* cited by examiner

ROTATING GROUP FOR TURBOMACHINE HAVING INTEGRATED WHEEL AND LABYRINTH SEAL ARRANGEMENT

CROSS REFERENCE TO RELATED APPLICATION

This application claims priority to Indian Provisional Application No. 202311037868, filed Jun. 1, 2023, the entire content of which is incorporated by reference herein.

TECHNICAL FIELD

The present disclosure relates, generally, to a turbomachine and relates, more particularly, to a rotating group for a turbomachine having an integrated wheel and labyrinth seal arrangement.

BACKGROUND

Turbomachines may be useful in vehicles and/or other environments. HVAC systems, for example, may include a compressor device for providing temperature-controlled air to a passenger compartment.

Preferably, these turbomachines operate at high efficiency in a variety of conditions. Also, these devices are preferably compact and lightweight. Moreover, these turbomachines preferably have a low part count, are relatively easy to make and assemble, and/or provide other manufacturing efficiencies.

However, it may be difficult to maintain high efficiency in some conditions. Furthermore, operating efficiency may be negatively affected by leakage flow of the working fluid. Seals and other features may be difficult to incorporate without significantly increasing weight, size, cost, part count, assembly time, etc.

Accordingly, there remains a need for a turbomachine that operates at high efficiency and that has a relatively low weight, size, and part count. Furthermore, there remains a need for such a turbomachine that also provides manufacturing efficiencies.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a turbomachine is disclosed that includes a housing and a rotating group supported for rotation about an axis of rotation within the housing. The rotating group includes a wheel and seal member that is unitary. The wheel and seal member includes a first wheel feature and a second wheel feature that are disposed in a back-to-back arrangement with an outer radial area disposed between the first and second wheel features and facing radially outward from the axis of rotation. The turbomachine also includes a plurality of labyrinthine seal members included on the outer radial area that cooperatively define, with the housing, a labyrinthine seal.

In another embodiment, a turbomachine includes a housing and a rotating group supported for rotation about an axis of rotation within the housing. The rotating group includes a wheel and seal member that is unitary. The wheel and seal member includes a wheel feature and an extension that extends along the axis of rotation from a back face of the wheel feature. The wheel feature includes a front face and an outer radial edge that is disposed axially between the front face and the back face. The back face gradually contours from the outer radial edge to the extension. The extension includes an outer radial area that faces away from the axis of rotation. The extension includes a plurality of labyrinthine seal members included on the outer radial area that cooperatively define, with the housing, a labyrinthine seal.

In a further embodiment, a turbomachine is disclosed that includes a housing, a fluid bearing system, and a rotating group supported for rotation about an axis of rotation within the housing by the fluid bearing system. The rotating group includes an integrated wheel and a seal member that is unitary. The integrated wheel and seal member includes a first wheel feature and a second wheel feature that are disposed in a back-to-back arrangement with an outer radial area of the wheel and seal member disposed between the first and second wheel features. The outer radial area faces radially outward from the axis of rotation. A plurality of first labyrinthine seal members is included on the outer radial area. The turbomachine also includes a first compressor stage, at least part of which is cooperatively defined by the first wheel feature and the housing. Furthermore, the turbomachine includes a second compressor stage, at least part of which is cooperatively defined by the second wheel feature. The second compressor stage is fluidly connected to the first compressor stage for receiving a fluid therefrom. The plurality of first labyrinthine seal members and the housing cooperatively define a first seal between the first compressor stage and the second compressor stage.

Furthermore, other desirable features and characteristics of the present disclosure will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the present disclosure and not to limit the scope of the present disclosure, which is defined by the claims. Furthermore, there is no intention to be bound by any expressed or implied theory presented in the preceding technical field, background, brief summary, or the following detailed description.

Broadly, example embodiments disclosed herein include a turbomachine with a unitary, monolithic, one-piece member of the rotating group. The member may include, at least, a wheel feature and a seal feature. The seal feature may be included on an extension that projects axially away from the wheel feature, and the seal feature may be included on an outer radial area of the extension. The seal feature may include a plurality of labyrinthine seal members. Because the seal feature and the wheel feature are integrally connected, the turbomachine may have a reduced part count, may be easier to assemble, and/or may provide other advantages. The integrated wheel and seal member may, in some embodiments, include additional features. For example, a second wheel feature, a second seal feature, a contoured flow surface, and/or other features may be included on the wheel and seal member of the present disclosure for providing additional convenience and advantage.

Figure 1:
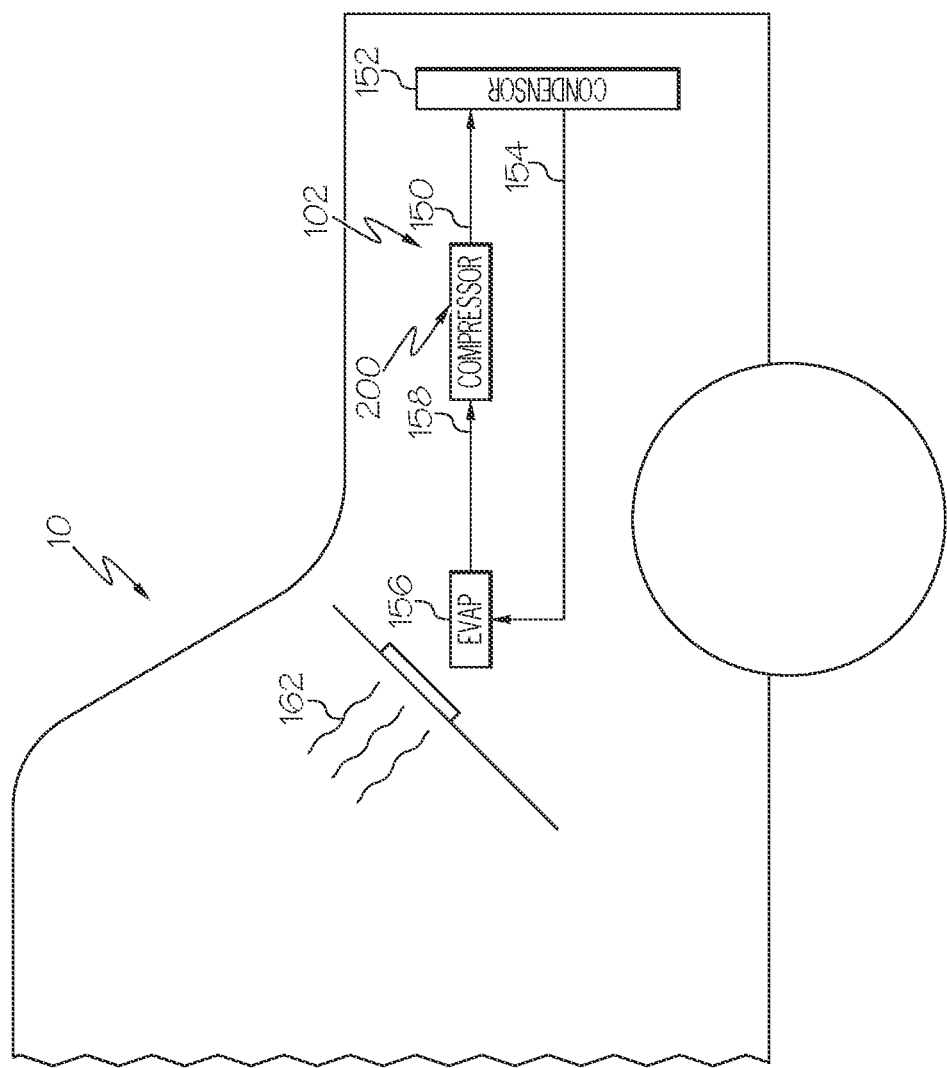
FIG. 1 is a schematic illustration of a fluid system with a compressor device according to example embodiments of the present disclosure.

FIG. 1 is a schematic view of front end of a vehicle 10, such as a passenger car. The vehicle 10 may include a fluid system 102, such as a coolant fluid system, an air conditioning system, refrigerant cycle for an HVAC system, etc. The fluid system 102 may include a compressor device 200 configured according to example embodiments of the present disclosure. The compressor device 200 may compress a working fluid, such as a fluid refrigerant, and the pressurized fluid stream 150 may flow toward a condenser 152 of the fluid system 102. The condenser 152 may exchange heat with a surrounding fluid, and a resulting fluid stream 154 may flow toward an evaporator 156. The evaporator 156 may also be configured for heat exchange with a surrounding fluid, and the evaporator 156 may provide a resulting input flow 158 back to the compressor device 200.

It will be appreciated that the evaporator 156 and/or condenser 152 may be operatively coupled to one or more fans (not shown) for enhancing heat transfer with the surrounding fluid. It will also be appreciated that the fluid system 102 may include other standard components, such as an expansion valve, drier, etc. for use as the working fluid moves through the thermodynamic cycle within the fluid system 102.

In the embodiment illustrated, the evaporator 156 may be used to provide temperature-controlled air 162 to the cabin of the vehicle 10. In some embodiments, the fluid system 102 may be provided in an electric vehicle, a solar-powered car, a fuel-cell vehicle, or other vehicle 10.

It will also be appreciated that the compressor device 200 may be configured differently, may be incorporated within a different fluid system, etc., without departing from the scope of the present disclosure. Furthermore, features of the present disclosure may be included on a different turbomachine, such as an electric motor-assisted turbocharger, without departing from the scope of the present disclosure.

Figure 2:
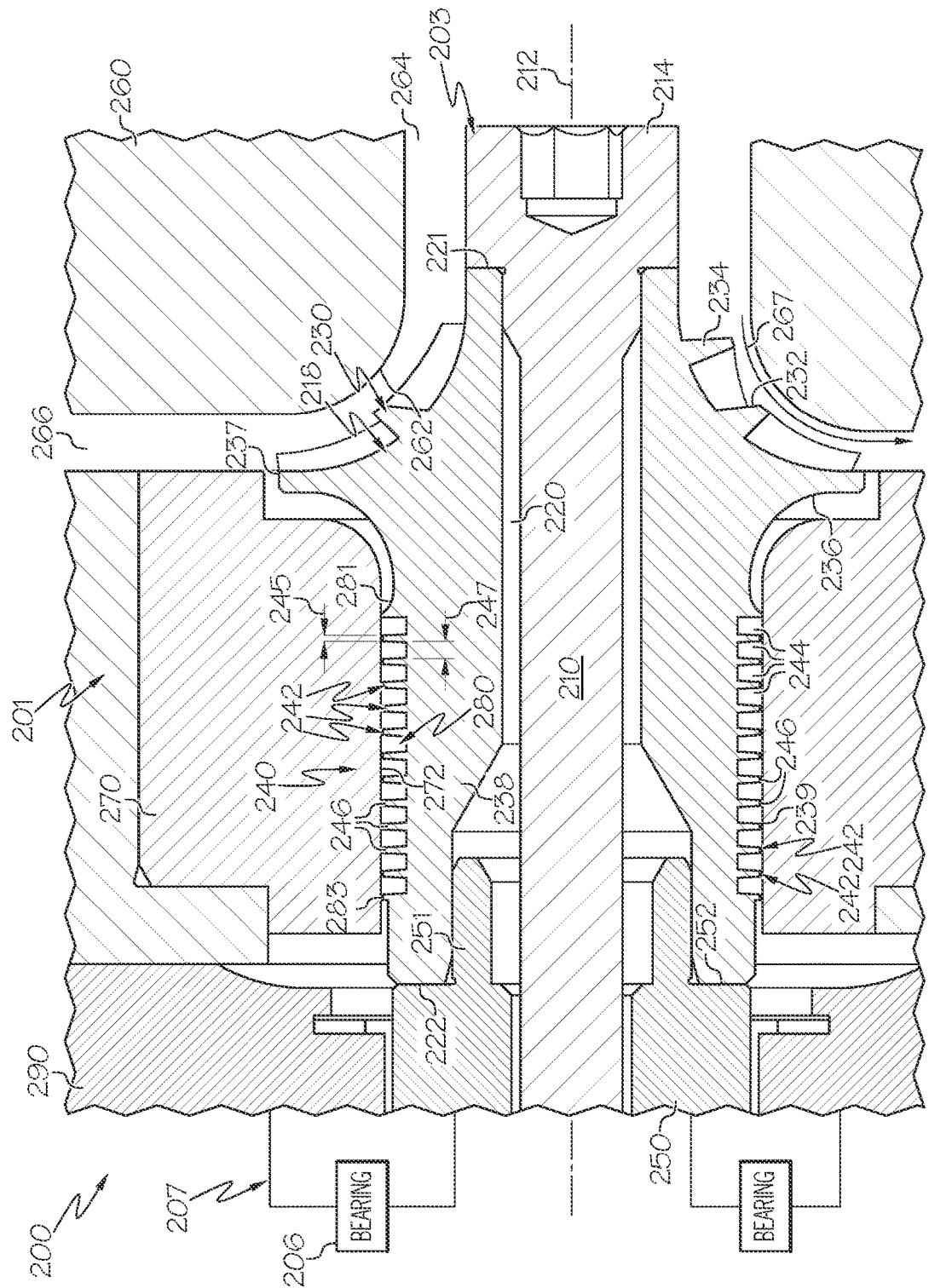
FIG. 2 is a cross-sectional view of a portion of a rotating group of a turbomachine, such as the compressor device of FIG. 1, configured according to example embodiments of the present disclosure.

As shown in FIG. 2, the compressor device 200 may generally include a housing assembly 201 and a rotating group 203. The rotating group 203 may be supported for rotation within the housing assembly 201 about an axis 212 of rotation by a bearing system 207. The bearing system 207 may be a fluid bearing system in some embodiments with one or more bearing components 206 included. The fluid that supports the bearing system 207 may be a gas, such as refrigerant, air, or other gas. The bearing components 206 may include one or more known journal members that support journaling of the rotating group 203 within the housing assembly 201 against radially-directed loads, and/or the bearing components 206 may include a known thrust disc (thrust member) that supports the rotating group 203 for rotation against axially-directed thrust loads. The bearing component 206 may be fluidly connected to openings, gaps, fluid passages, apertures, etc. that are defined between the rotating group 203 and the housing assembly 201.

The rotating group 203 may include a shaft portion 210, which is elongate and which extends along an axis of rotation 212. The shaft portion 210 may be substantially centered on the axis 212. The shaft portion 210 may include a fastener head 214 at one end of the shaft portion 210.

The rotating group 203 may further include an integrated wheel and seal member 218. The integrated wheel and seal member 218 may be a unitary, one-piece part. The integrated wheel and seal member 218 may include a first end 221 and a second end 222 that are spaced apart along the axis 212. The wheel and seal member 218 may further include a bore opening 220 that extends centrally through the wheel and seal member 218, along the axis 212, between the first end 221 and the second end 222.

The wheel and seal member 218 may include and/or define a wheel feature 230 (e.g., a compressor wheel, wheel portion, etc.). The wheel feature 230 may be disc-shaped and may include a front face 232 that contours from the first end 221 and outward radially from the axis 212 to terminate at an outer radial edge 237. The front face 232 may include a plurality of blades 234. The wheel feature 230 may further include a back face 236 that faces toward the second end 222. The outer radial edge 237 may define a transition between the front face 232 and the back face 236.

The wheel and seal member 218 may further include a wheel extension 238. The wheel extension 238 may be hollow and cylindrical. The wheel extension 238 may extend along the axis 212, away from the back face 236 of the wheel feature 230, and may terminate at the second end 222. The back face 236 may gradually contour from the outer radial edge 237 to the wheel extension 238. The wheel extension 238 may include an outer radial area 239 that faces radially outward from the axis of rotation 212. The outer radial area 239 may have a significantly smaller radius as compared to the outer radial edge 237 of the wheel feature 230.

The wheel and seal member 218 may additionally include a seal feature 240. The seal feature 240 may comprise a plurality of labyrinthine seal members 242. The seal members 242 may be defined on the outer radial area 239 of the wheel extension 238. The labyrinthine seal members 242 may include a plurality of annular recesses 244 that are recessed into the outer radial area 239 in a direction normal to the axis 212. The seal recesses 244 may be spaced substantially evenly apart along the axis 212 on the wheel extension 238. The seal feature 240 may also include a plurality of annular flanges 246 that are defined between adjacent pairs of the recesses 244. The flanges 246 may be disposed perpendicular to the axis 212 and may have a thickness 245 that is measured along the axis 212. The thickness 245 may be substantially the same (i.e., uniform) for each of the flanges 246 in some embodiments. Also, the thickness 245 of at least one flange 246 may be less than a width 247 of the recess 244 defined from that flange 246 to the next adjacent flange 246.

Furthermore, the rotating group 203 may include a collar 250. The collar 250 may be hollow and cylindrical. The collar 250 may be supported on and fixed to the shaft portion 210. Also, the collar 250 may include an annular end 251 that is received in the bore 220 of the wheel and seal member 218. The collar 250 may include an axially-facing step 252 that abuts axially against the second end 222 of the wheel feature 230 and seal member 218. The fastener head 214 may abut axially against the first end 221 of the wheel feature 230 with the shaft portion 210 extending through the bore opening 220 and into the collar 250. As such the wheel and seal member 218 may be fixedly supported on the rotating group 203 between the fastener head 214 and collar 250.

Although not shown specifically in FIG. 2, it will be appreciated that the rotating group 203 may include a number of additional features. For example, the shaft portion 210 may extend through the collar 250 and couple (e.g., threadably couple) to a complimentary shaft member of the rotating group 203. In other embodiments, the shaft portion 210 may fixedly attach (e.g., threadably attach) directly to the collar 250. As such, the wheel feature 230 may be operatively coupled to an electric motor, electric generator, another wheel, or another component of the turbomachine.

The housing assembly 201 may be shaped and configured to house and surround the rotating group 203. In some embodiments, the housing assembly 201 may include a compressor housing 260 with a shroud surface 262 that faces and opposes the front face 232 and blades 234 of the wheel feature 230. The compressor housing 260 may also define a fluid inlet 264 that is directed axially (in a downstream direction) toward the front face 232 of the wheel feature 230. The compressor housing 260 may also define a fluid outlet 266 that is directed circumferentially away from the outer radial edge 237 of the wheel feature 230. The wheel feature 230 and the compressor housing 260 may cooperatively define a fluid flow path 267 for a compressor stage of the compressor device 200. The fluid flow path 267 may be directed from the inlet 264, through the gap between the wheel feature 230 and shroud surface 262, and radially outward to the outlet 266. Applying these features to the embodiments of FIG. 1, the input flow 158 may be introduced at the inlet 264 to flow along the fluid flow path 267 toward the outlet 266, where the pressurized fluid stream 150 is provided toward the condenser 152.

The housing assembly 201 may further include a back plate 270. The back plate 270 may be annular. The back plate 270 may be supported and fixed to the compressor housing 260. The back plate 270 may surround both the outer radial edge 237 and the outer radial area 239 of the extension 238. The back plate 270 may include an inner radial surface 272 that may be smooth and continuous. The inner radial surface 272 may oppose the seal members 242. In some embodiments, the back plate 270 may be constructed from a material that is softer than that of the wheel feature 230. For example, the wheel and seal member 218 may be constructed from a metal, such as an aluminum alloy, whereas the back plate 270 may be constructed from a softer plastic, composite material, bronze, or brass. In other words, the wheel and seal member 218 may have higher material hardness than the back plate 270.

The housing assembly 201 may additionally include an outer housing 290. The outer housing 290 may be fixed to one side of the compressor housing 260. The outer housing 290 may receive the collar 250 of the rotating group 203. The outer housing 290 may also include an e-machine housing (e.g., a motor housing) that houses a stator and rotor member of an e-machine. The outer housing 290 may further include one or more bearing housing members that houses and/or supports a bearing component of the bearing system 207. For example, the outer housing 290 may include journal members that support journaling of the rotating group 203 within the housing assembly 201.

The inner radial surface 272 of the back plate 270 and the seal members 242 may cooperatively define a labyrinthine seal 280. The seal 280 may extend generally along the axial direction along the wheel extension 238. The seal 280 may extend axially and may define a compressor side 281 and a bearing side 283, which are on opposite axial ends thereof. If there is leakage from the fluid flow path 267, this leakage flows from the compressor side 281 along a tortuous path away from the back face 236, sequentially past the seal members 242, and toward the bearing side 283.

Accordingly, the seal 280 may substantially limit fluid leakage. The seal 280 may substantially limit flow axially from the bearing component 206 toward the back face 236 of the wheel member 230. The seal 280 may ensure that a predetermined pressure is maintained at the bearing component 206 and at the back face 236 of the wheel member 230. This may reduce gas overflows between the compressor flow path 267 and the bearing component 206. The seal 280 may, therefore, maintain high compressor efficiency. The integrated wheel and seal member 218 may also reduce part count because it is monolithic. The integrated wheel and seal member 218 may also simplify assembly and/or provide other manufacturing efficiencies.

Figure 3:
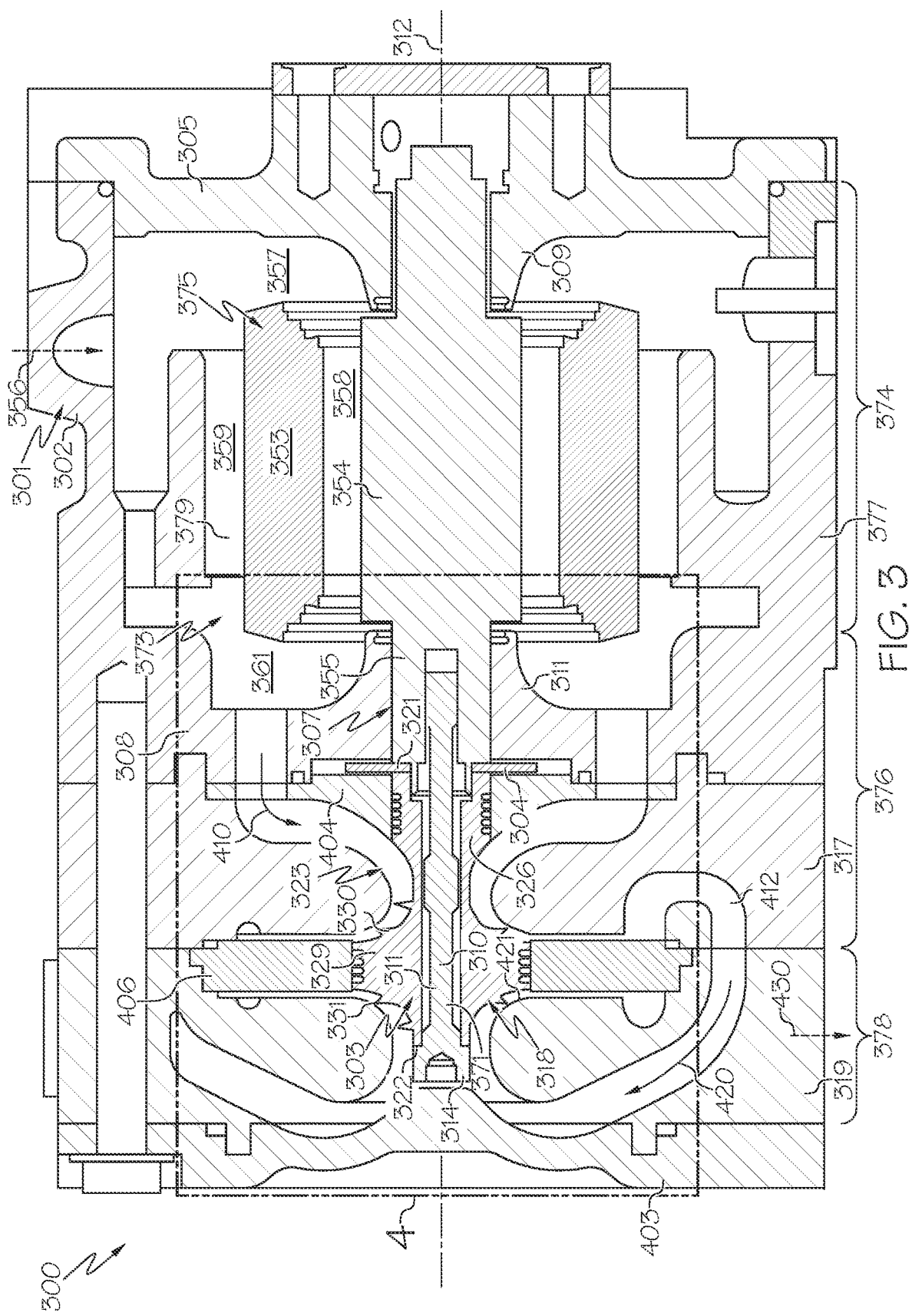
FIG. 3 is a cross-sectional view of a turbomachine, such as the compressor device of FIG. 1, configured according to additional example embodiments of the present disclosure.
Figure 4:
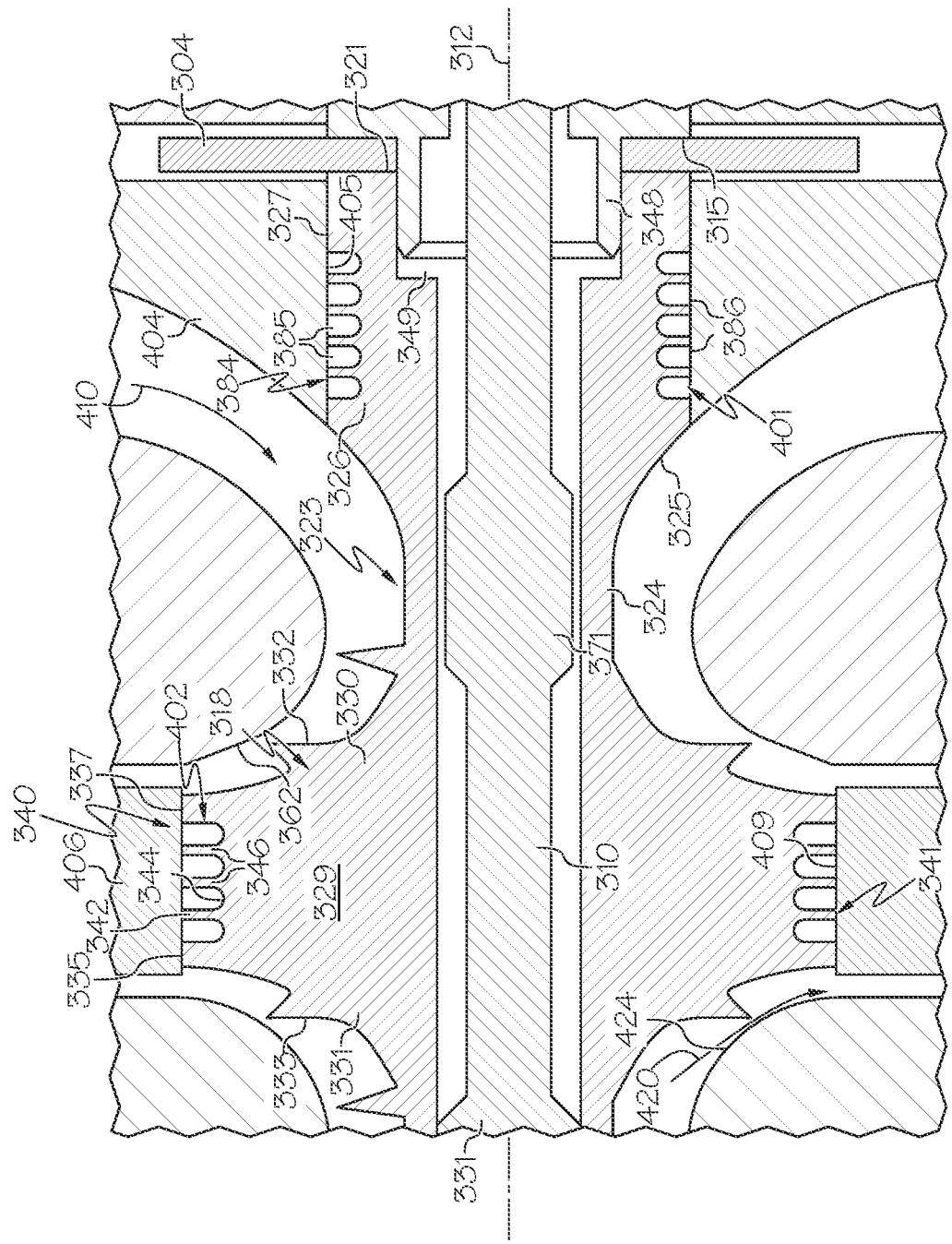
FIG. 4 is a detail cross-sectional view of a portion of the turbomachine of FIG. 3.

Referring now to FIGS. 3 and 4, additional embodiments of the compressor device 300 are shown. Features corresponding to those discussed above are indicated with corresponding reference numbers increased by 100.

The compressor device 300 may be configured as a multi-stage compressor device with an operatively coupled e-machine 373. In other words, the compressor device 300 may include a motor stage 374, a first compressor (low pressure) stage 376, and a second compressor (high pressure) stage 378. The motor stage 374, the first compressor stage 376, and the second compressor stage 378 may be arranged sequentially along the axis 312. In some embodiments, the first compressor stage 376 may be disposed axially between the motor stage 374 and the second compressor stage 378.

The rotating group 303 and housing assembly 301 may be configured to cooperatively define the motor stage 374, the first compressor stage 376, and the second compressor stage 378. The rotating group 303 may include the integrated wheel and seal member 318, which shares some of the features discussed above with the wheel and seal member 218 of FIG. 2, but which also includes additional features that will be discussed.

The motor stage 374 may include an electric motor 375, which is housed within a motor housing 377 of the housing assembly 301. The motor housing 377 may define a motor cavity 379, which receives a stator member 353 and a rotor member 354 of the motor 375. The stator member 353 may be fixed to the motor housing 377, and the rotor member 354 may be supported on shaft member 355 of the rotating group 303.

The motor housing 377 may include an outer portion 302 that extends about the motor 375 in the circumferential direction. The motor housing 377 may also include a first axial wall portion 305 and a second axial wall portion 308 that are fixed to the outer portion 302 and disposed on opposite axial ends of the motor 375. In some embodiments, the first axial wall portion 305 may include a first journal member 309 of the bearing system 307, and the second axial wall portion 308 may include a second journal member 311 of the bearing system 307. The first journal member 309 and second journal member 311 support respective portions of the shaft member 355 and may support the shaft member 355 for rotation about the axis 312.

The motor housing 377 may include at least one fluid inlet 356 extending from outside the motor housing 377 and into the motor cavity 379 therein. Also, the motor cavity 379 and/or the motor 375 may be configured to define one or more fluid cavities, flow paths, flow channels, passageways, etc. For example, there may be a first axial chamber 357 defined at one axial end of the motor 375, an inner radial passage 358 defined in the gap between the stator member 353 and rotor member 354, an outer radial passage 359 defined between the stator member 353 and the motor housing 377, and a second axial chamber 361 defined at the opposite axial end of the motor 375.

Accordingly, during operation, fluid coolant may be provided from the inlet 356 into the motor cavity 379. This fluid may flow in a downstream direction into the first axial chamber 357, generally in the axial direction along the inner and outer radial passages 358, 359, and into the second axial chamber 361. The coolant may cool the motor 375, the bearing system 309, and/or other components via this flow through the motor stage 374. This fluid may flow into the first compressor stage 376 and further downstream into the second compressor stage 378 as will be discussed.

The integrated wheel and seal member 318 may extend axially through both the first and second compressor stages 376, 378. As shown, the wheel and seal member 318 may include a first wheel feature 330 and a second wheel feature 331, which may be disposed in a back-to-back arrangement. More specifically, as shown in FIG. 4, the first wheel feature 330 may include a first front face 332, and the second wheel feature 331 may include a second front face 333 that faces away in the opposite axial direction from the first front face 332. The integrated wheel and seal member 318 may include a middle extension 329 that extends between the wheel features 330, 331 and that is common to both wheel features 330, 331. The middle extension 329 may support the first front face 332 to face axially opposite from the second front face 333. In some embodiments, the outer radial edge 337 of the first wheel feature 330 may have substantially the same radius as an outer radial edge 335 of the second wheel feature 331. An outer radial area 341 of the wheel and seal member 318 may be defined on the middle extension 329 between the outer radial edges 337, 335 of the wheels 330, 331 and may be disposed substantially at the same radius of the outer radial edges 335, 337.

Also, similar to the embodiments of FIG. 2, the seal feature 340 may be integrally defined on the outer radial area 341. Thus, the seal feature 340 may be defined behind both the first face 332 of the first wheel feature 330 and the second face 333 of the second wheel feature 331. The seal feature 340 may comprise a plurality of labyrinthine seal members 342 with annular recesses 344 that are recessed into the outer radial area 341 in a direction normal to the axis 312. The seal recesses 344 may be spaced substantially evenly apart along the axis 312. The seal feature 340 may also include a plurality of annular flanges 346 that are defined between adjacent pairs of the recesses 244. The flanges 346 may be disposed perpendicular to the axis 312. The flanges 346 may be thinner than the width of the annular recesses 344, similar to the embodiments of FIG. 2. In additional embodiments, the seal feature 340 may be included on a part that is independent from but removably connected to the first and second wheel features 330, 331.

As shown in FIG. 3, the second face 333 of the second wheel feature 331 may be contoured and may terminate at the second end 322, which may be substantially perpendicular to the axis 312. The wheel and seal member 318 may further include an extension 323. The extension 323 may be generally cylindrical and hollow. The extension 323 may extend axially from the first wheel member 330 and may terminate at the first end 321.

As shown in FIG. 4, the extension 323 may include a flow inlet feature 324, which may be hollow, cylindrical, and relatively thin-walled. The flow inlet feature 324 may extend axially away from the first face 332 of the first wheel feature 330. The flow inlet feature 324 may also include one or more flow surfaces 325 that are contoured to define a fluid flow path as will be discussed.

The extension 323 may also include a seal portion 326. The seal portion 326 may include an outer diameter area 327 with a diameter that is greater than that of the flow inlet feature 324. The outer diameter area 327 may include a second seal feature 384. The second seal feature 384 may be integrally defined on the outer diameter area 327. The second seal feature 384 may comprise a plurality of annular recesses 385 that are recessed into the outer diameter area 327. The recesses 385 may be spaced substantially evenly apart along the axis 312. The second seal feature 384 may also include a plurality of annular flanges 386 that are defined between adjacent pairs of the recesses 385. The flanges 386 may be disposed perpendicular to the axis 312. The flanges 386 may be thinner than the width of the annular recesses 385. The first end 321 of the wheel and seal member 318 may face axially and may be defined on the extension 323.

The extension 323 may also include a receiving opening 349 at the first end 321. The receiving opening 346 may have a widened inner diameter for receiving a stub end 348 of the shaft member 355.

The bearing system 307 may further include a thrust member 304. The thrust member 304 may be annular and disc shaped. The thrust member 304 may be received upon the stub end 348. Also, the thrust member 304 may be disposed between and may abut the first end 321 and a step 315 of the shaft member 355 to secure the thrust member 304 to the rotating group 303.

The head 314 of the fastener 371 may abut against the second end 322, and a shaft portion 310 of the fastener 371 may extend through the first and second wheel features 330, 331 and the extension 323 to be received within and fasten to the shaft member 355. Thus, the rotating group 303 may be cooperatively defined by, at least, the rotor member 354, the shaft member 355, the thrust member 304, the wheel and seal member 318, and the fastener 371.

The housing assembly 301 may house the integrated wheel and seal member 318, and the wheel and seal member 318 may extend through both the first compressor stage 376 and the second compressor stage 378. The housing assembly 301 may include a first stage outer housing 317, a second stage outer housing 319, and an end cap 403, which may be stacked and fixed axially over the wheel and seal member 318.

Furthermore, the housing assembly 301 may include a seal plate 404. The seal plate 404 may be annular and may be fixed to the motor housing 377. As shown in FIG. 4, the seal plate 404 may include an inner radial area 405 that opposes the second seal feature 384. Thus, the inner radial area 405 and the second seal feature 384 may define a first seal 401 with a tortuous flow path that extends generally axially between the thrust member 304 and the flow surface 325.

Moreover, the housing assembly 301 may include a back plate 406. The back plate 406 may be annular and may be fixed between the first stage outer housing 317 and the second stage outer housing 319. The back plate 406 may include an inner radial area 409 that opposes the seal feature 340. Accordingly, the inner radial area 409 and the seal feature 340 may define a second seal 402 with a tortuous flow path that extends generally axially between the first front face 332 and the second front face 333.

As shown in FIG. 3, the seal plate 404, the first stage outer housing 317, and the flow surface 325 may define a first stage flow path 410. The first stage flow path 410 may be fluidly connected to the second axial chamber 361. The first stage flow path 410 may extend in a downstream direction from the chamber 361 toward the first front face 332 of the first wheel feature 330. The first stage flow path 410 may flow axially through the seal plate 404 and may turn radially inward to contour along the flow surface 325 and turn back axially toward the front face 332 of the first wheel feature 330. The fluid may flow along the front face 332 and the shroud surface 362 to be compressed and directed toward a first compressor outlet 412.

The outlet 412 may extend through the first stage outer housing 317 and may turn back toward the second stage outer housing 319. The second stage housing 319 may define a second stage flow path 420 that contours inwardly radially toward the axis 312 where the second stage flow path 420 turns axially toward the second front face 333 of the second wheel feature 331. Moving further downstream, the second stage flow path 420 is defined between the second front face 333 and a second shroud surface 421 of the second stage outer housing 319. Fluid in the second stage flow path 420 may flow further downstream in the radial and circumferential direction to be compressed before being discharged via a fluid outlet 430.

Thus, the compressor device 300 may provide efficient operation. Also, the first wheel feature 330, the second wheel feature 331, the first seal feature 340, the flow surface 325, and the second seal feature 384 of the extension 323 may be integrally connected such that the wheel and seal member 318 is monolithic, unitary, and one-piece. As such, the part count of the compressor device 300 may be reduced, weight may be reduced, assembly time may be reduced, etc. Furthermore, the first seal 401 may limit leakage flow from the thrust member 304 toward the first stage flow path 410. The first seal 401 may also help balance pressure in the motor cavity. Additionally, the second seal 402 may effectively limit leakage from the first compressor stage 376 to the second compressor stage 378 of the compressor device 300.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:
1. A turbomachine comprising:
   a housing;
   a rotating group supported for rotation about an axis of rotation within the housing, the rotating group including a wheel and seal member that is unitary, the wheel and seal member including a first wheel feature with a first outer radial edge and a second wheel feature with a second outer radial edge that are disposed in a back-to-back arrangement with an outer radial area disposed between the first and second wheel features and facing radially outward from the axis of rotation, the outer radial area defined by a surface extending axially between the first outer radial edge and the second outer radial edge and disposed at a common radius with the first outer radial edge and the second outer radial edge, the common radius defined from the axis of rotation; and
   a plurality of labyrinthine seal members recessed into the outer radial area to cooperatively define, with the housing, a labyrinthine seal.

2. The turbomachine of claim 1, wherein the wheel and seal member includes an extension that extends along the axis of rotation from the first wheel feature, the extension including a contoured flow surface on an outer radial portion of the extension, the contoured flow surface defining part of a flow path for fluid that is directed toward the first wheel feature.

3. The turbomachine of claim 2, wherein the labyrinthine seal is a first labyrinthine seal; and
wherein the extension includes a plurality of second labyrinthine seal members that cooperates with the housing to define a second labyrinthine seal.

4. The turbomachine of claim 3, further comprising a seal plate that receives the extension and that cooperates with the plurality of second labyrinthine seal members to define the second labyrinthine seal, the seal plate defining another part of the flow path through the housing to the contoured flow surface.

5. The turbomachine of claim 4, further comprising an electric motor that is received in a motor cavity of the housing, the electric motor operatively connected to the wheel and seal member; and
wherein the flow path extends in a downstream direction from the motor cavity, through the seal plate, to the contoured flow surface.

6. The turbomachine of claim 1, wherein the first wheel feature is a first compressor wheel of a first stage compressor of the turbomachine, and wherein the second wheel feature is a second compressor wheel of a second stage compressor of the turbomachine configured to receive flow from the first stage compressor.

7. The turbomachine of claim 1, further comprising a fluid bearing system with a thrust bearing member that is configured to support rotation of the rotating group about the axis of rotation; and
wherein the wheel and seal member includes an extension that extends along the axis of rotation from the first wheel feature, the extension abutting against the thrust bearing member to secure the thrust bearing member to the rotating group.

8. The turbomachine of claim 7, wherein the labyrinthine seal is a first labyrinthine seal; and
wherein the extension includes a plurality of second labyrinthine seal members that cooperates with the housing to define a second labyrinthine seal.

9. A turbomachine comprising:
a housing;
a fluid bearing system;
a rotating group supported for rotation about an axis of rotation within the housing by the fluid bearing system, the rotating group including an integrated wheel and seal member that is unitary;
the integrated wheel and seal member including a first wheel feature and a second wheel feature that are disposed in a back-to-back arrangement with an outer radial area of the wheel and seal member defined by a surface extending axially between the first and second wheel features and disposed at a common radius with outer radial edges of the first wheel feature and the second wheel feature, the outer radial area facing radially outward from the axis of rotation, a plurality of first labyrinthine seal members recessed into the outer radial area;
a first compressor stage, at least part of which is cooperatively defined by the first wheel feature and the housing;
a second compressor stage, at least part of which is cooperatively defined by the second wheel feature, the second compressor stage fluidly connected to the first compressor stage for receiving a fluid therefrom;
the plurality of first labyrinthine seal members and the housing cooperatively defining a first labyrinthine seal between the first compressor stage and the second compressor stage;
the wheel and seal member including an extension that is integrally attached to the first wheel feature and the second wheel feature, the extension extending along the axis of rotation from the first wheel feature, the extension including a contoured flow surface on an outer radial portion of the extension, the contoured flow surface defining part of a flow path for fluid that is directed toward the first wheel feature; and
the extension including a plurality of second labyrinthine seal members recessed into the extension and the plurality of second labyrinthine seal members cooperating with the housing to define a second labyrinthine seal.

10. The turbomachine of claim 9, wherein the fluid bearing system includes a thrust bearing member configured to support the rotating group for rotation within the housing against thrust loads, the wheel and seal member having an end that abuts against the thrust bearing member, and the second labyrinthine seal defined axially between the thrust bearing member and the flow path.

11. The turbomachine of claim 10, further comprising an electric motor that is received in a motor cavity of the housing, the electric motor operatively connected to the wheel and seal member; and
wherein the flow path extends in a downstream direction from the motor cavity to the first wheel member.

12. A motorized compressor device comprising:
a motor stage with an electric motor and a motor housing with a motor cavity that receives the electric motor;
a first compressor stage with a first compressor stage housing; and
a second compressor stage with a second compressor stage housing, the first compressor stage disposed axially along a longitudinal axis between the motor stage and the second compressor stage;
a rotating group extending along the longitudinal axis through the motor stage, the first compressor stage and the second compressor stage, the rotating group supported for rotation about the longitudinal axis relative to the motor housing, the first compressor stage housing, and the second compressor stage housing, the rotating group including a wheel-and-seal member that is unitary, the wheel-and-seal member including a first wheel feature that is disposed in the first compressor stage housing and a second wheel feature that is disposed in the second compressor stage housing, the first wheel feature and the second wheel feature disposed in a back-to-back arrangement along the longitudinal axis, the rotating group including an outer radial area disposed between the first wheel feature and the second wheel feature along the longitudinal axis and facing radially outward from the axis of rotation, the outer radial area defined by a surface extending axially along the longitudinal axis between the first wheel feature and the second wheel feature and disposed at a common radius with outer radial edges of the first wheel feature and the second wheel feature, the wheel-and-seal member including an extension that extends along the longitudinal axis from the first wheel feature and the second wheel feature, the extension including a contoured flow surface on an outer radial portion of the extension;

a fluid coolant flowpath for cooling the motorized compressor device comprising the motor cavity, a first segment through the first compressor stage, and a second segment through the second compressor stage, the fluid coolant flowpath extending in a downstream direction from the motor cavity, through the first segment, to the second segment, the contoured flow surface and the first compressor stage housing cooperatively defining at least part of the first segment;

a plurality of first labyrinthine seal members recessed into the outer radial area that define a first labyrinthine fluid seal along the longitudinal axis between the first compressor stage and the second compressor stage; and a plurality of second labyrinthine seal members recessed into the extension and cooperating with the first compressor stage housing to define a second labyrinthine fluid seal along the longitudinal axis.

* * * * *